United States Patent
Ikeda et al.

(10) Patent No.: US 8,314,777 B2
(45) Date of Patent: Nov. 20, 2012

(54) INFORMATION PROCESSING APPARATUS AND VIBRATION CONTROL METHOD IN INFORMATION PROCESSING APPARATUS

(75) Inventors: Tetsuo Ikeda, Tokyo (JP); Ken Miyashita, Tokyo (JP); Tatsushi Nashida, Kanagawa (JP); Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 674 days.

(21) Appl. No.: 12/494,647

(22) Filed: Jun. 30, 2009

(65) Prior Publication Data

US 2009/0262091 A1    Oct. 22, 2009

(30) Foreign Application Priority Data

Jul. 1, 2008 (JP) ................. P2008-172408

(51) Int. Cl.
G06F 3/041 (2006.01)
(52) U.S. Cl. ........................ 345/173; 715/863
(58) Field of Classification Search .......... 345/176–178, 345/418–689; 715/200–867
See application file for complete search history.

(56) References Cited

U.S. PATENT DOCUMENTS

| | | | |
|---|---|---|---|
| 2003/0179190 A1* | 9/2003 | Franzen | 345/173 |
| 2006/0026536 A1* | 2/2006 | Hotelling et al. | 715/863 |
| 2006/0061545 A1* | 3/2006 | Hughes et al. | 345/156 |
| 2006/0214935 A1* | 9/2006 | Boyd et al. | 345/473 |
| 2006/0279537 A1* | 12/2006 | Kim et al. | 345/156 |
| 2007/0022389 A1* | 1/2007 | Ording et al. | 715/790 |
| 2007/0146334 A1* | 6/2007 | Inokawa | 345/173 |
| 2007/0300190 A1* | 12/2007 | Bier et al. | 715/862 |
| 2008/0062145 A1* | 3/2008 | Shahoian et al. | 345/173 |
| 2008/0088620 A1* | 4/2008 | Shih et al. | 345/420 |
| 2008/0224995 A1* | 9/2008 | Perkunder | 345/157 |
| 2010/0315345 A1* | 12/2010 | Laitinen | 345/173 |

FOREIGN PATENT DOCUMENTS

| | | |
|---|---|---|
| JP | 2001-296950 | 10/2001 |
| JP | 2002-149312 | 5/2002 |
| JP | 2003-337649 | 11/2003 |
| JP | 2004-86711 | 3/2004 |
| JP | 2004-94666 | 3/2004 |
| JP | 2004-309962 | 11/2004 |
| JP | 2005-149197 | 6/2005 |
| JP | 2005-267080 | 9/2005 |
| JP | 2005-332063 | 12/2005 |

* cited by examiner

*Primary Examiner* — Amare Mengistu
*Assistant Examiner* — Vinh Lam
(74) *Attorney, Agent, or Firm* — Finnegan, Henderson, Farabow, Garrett & Dunner, L.L.P.

(57) ABSTRACT

There is provided an information processing apparatus including a display control unit that moves a display position of an object in accordance with movement of a contact position when the position in a screen where the object is displayed is contacted and moved and a vibration control unit that vibrates the contact position with a vibration amount in accordance with a parameter amount of data associated with the object when the display position of the object moves.

11 Claims, 7 Drawing Sheets

VIBRATION CONTROL EXAMPLE

ENLARGED VIEW OF REGIONS X1 AND X2

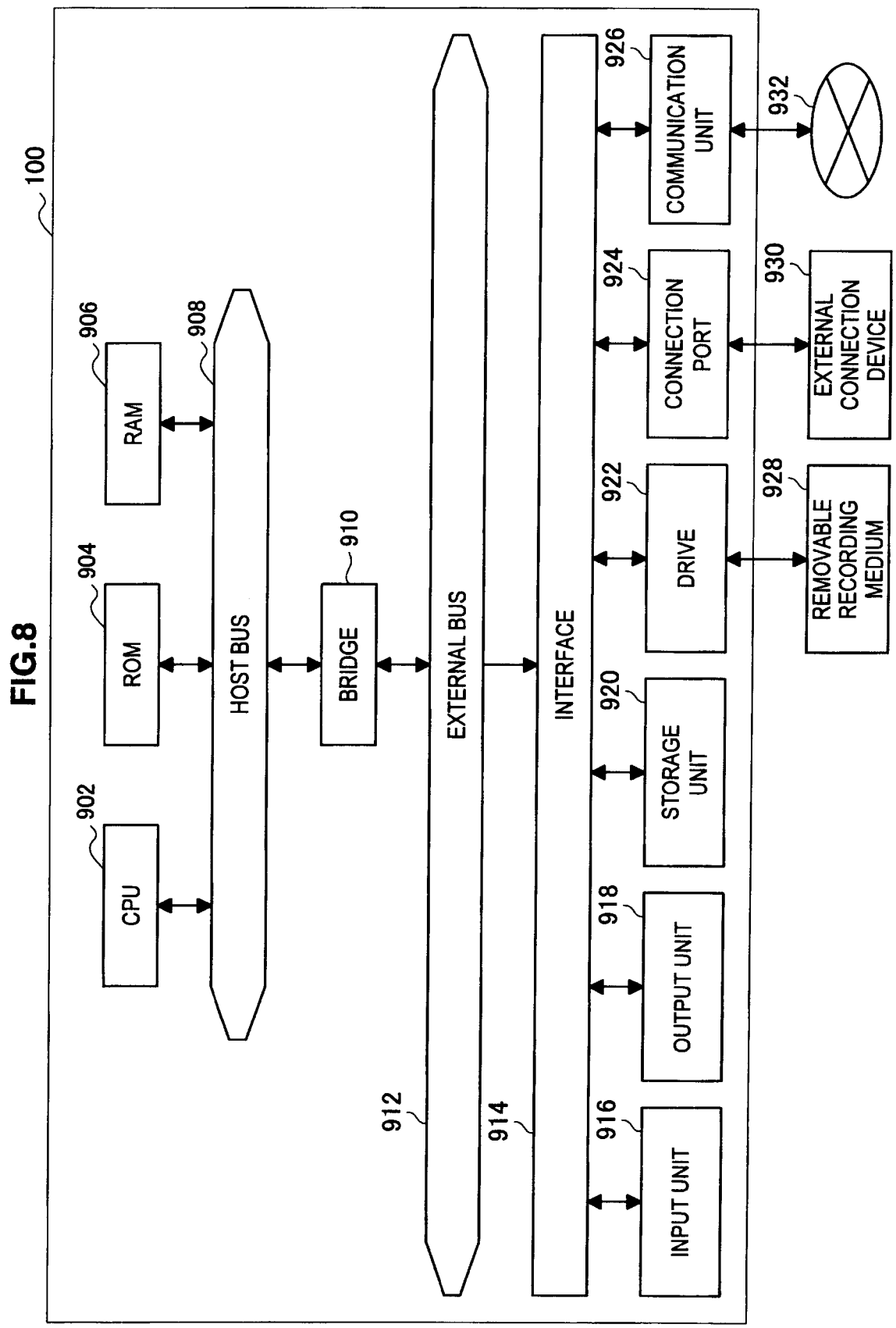

INFORMATION PROCESSING APPARATUS AND VIBRATION CONTROL METHOD IN INFORMATION PROCESSING APPARATUS

BACKGROUND OF THE INVENTION

1. Field of the Invention

The present invention relates to an information processing apparatus and a vibration control method in the information processing apparatus.

2. Description of the Related Art

In recent years, a touch panel used by a user to operate objects displayed in a screen after the display screen being directly touched by the user is frequently mounted in small-sized electronic devices and automatic transaction devices. By using the touch panel, an intuitive operation feeling is realized and an advantage of being able to easily perform operations even for a user who is unfamiliar with operations of a keyboard, keypad or the like is achieved. In some recent electronic devices, when the user operates a touch panel, a display object displayed in the screen is moved or predetermined processing is performed by the movement operation.

In connection with such a technology, for example, Japanese Patent Application Laid-Open No. 2002-149312 discloses a technology to provide a vibration to an electronic device in accordance with behavior of a display object. Japanese Patent Application Laid-Open No. 2004-86711 and Japanese Patent Application Laid-Open No. 2004-309962 disclose a technology to change a vibration amount in accordance with the position on the touch panel touched by the user. Further, Japanese Patent Application Laid-Open No. 2005-149197 discloses a technology to gradually change the vibration amount after the time when the touch panel is touched by the user until processing corresponding to a touch operation is determined. Thus, the operation feeling of the user can be improved by combining touch panel operations and vibration.

SUMMARY OF THE INVENTION

As described above, much research and development has been conducted on technology to combine a touch panel and vibration to improve the operation feeling of the touch panel. However, no technology that enables a user to detect attributes or characteristics of data associated with a display object by vibration is known. If a touch panel is used, as described above, the user can perform predetermined processing by directly operating a display object. Technological innovations to effectively communicate information about data associated with a display object to the user by making full use of convenience of such a touch panel are sought after.

The present invention has been made in view of the above issue and there is a need for a novel and improved information processing apparatus capable of communicating a parameter amount of data about to be processed by a user using a display object to the user by vibration and a vibration control method in the information processing apparatus.

In order to solve the above issue, according to an embodiment of the present invention, there is provided an information processing apparatus, including: a display control unit that moves a display position of an object in accordance with movement of a contact position when the position in a screen where the object is displayed is contacted and moved; and a vibration control unit that vibrates the contact position with a vibration amount in accordance with a parameter amount of data associated with the object when the display position of the object moves.

If the moving object comes into contact with another object displayed in the screen, the display control unit may be configured to cause the other object and the moving object to move together. In this case, the vibration control unit is configured to vibrate the contact position with the vibration amount in accordance with the total parameter amount of both objects moving together.

The vibration control unit may be configured to vibrate the contact position with the vibration amount larger that that during movement of the object for only a predetermined period when the object starts to move.

The vibration control unit may be configured to vibrate the contact position with the vibration amount larger than that when both objects move together for only a predetermined period after the moving object comes into contact with the other object.

As the parameter amount, a period from an acquisition time or an update time of data associated with the object until the time when the object starts to move may be used. In this case, the vibration control unit is configured to vibrate the contact position with an increasing vibration amount as the period becomes longer.

A data size of data associated with the object may be used as the parameter amount.

Video data or music data may be used as the data. In this case, a reproduction time of data associated with the object is used as the parameter amount.

Image data may be used as the data. In this case, an image size of data associated with the object is used as the parameter amount.

The data may contain a plurality of pieces of content. In this case, the number of pieces of content contained in the data is used as the parameter amount.

If a display screen is touched by a finger and the display position of the object is moved, the vibration control unit may be configured to change the vibration amount in accordance with the number of fingers brought into contact with the display screen.

The vibration control unit may be configured to reduce the vibration amount when the number of fingers increases.

In order to solve the above issue, according to another embodiment of the present invention, there is provided a vibration control method in an information processing apparatus, including the steps of: exercising movement control of a display position of an object in accordance with movement of a contact position when the position in a screen where the object is displayed is contacted and moved; and exercising control so that the contact position vibrates with a vibration amount in accordance with a parameter amount of data associated with the object when the movement control of the display position of the object is exercised.

According to the embodiments of the present invention described above, it becomes possible to communicate the parameter amount of data about to be processed by a user using a display object to the user by vibration. As a result, a more intuitive operation system is realized.

BRIEF DESCRIPTION OF THE DRAWINGS

FIG. 8 is an explanatory view showing a hardware configuration example of the information processing apparatus according to the present embodiment.

DETAILED DESCRIPTION OF THE PREFERRED EMBODIMENTS

Figure 1:
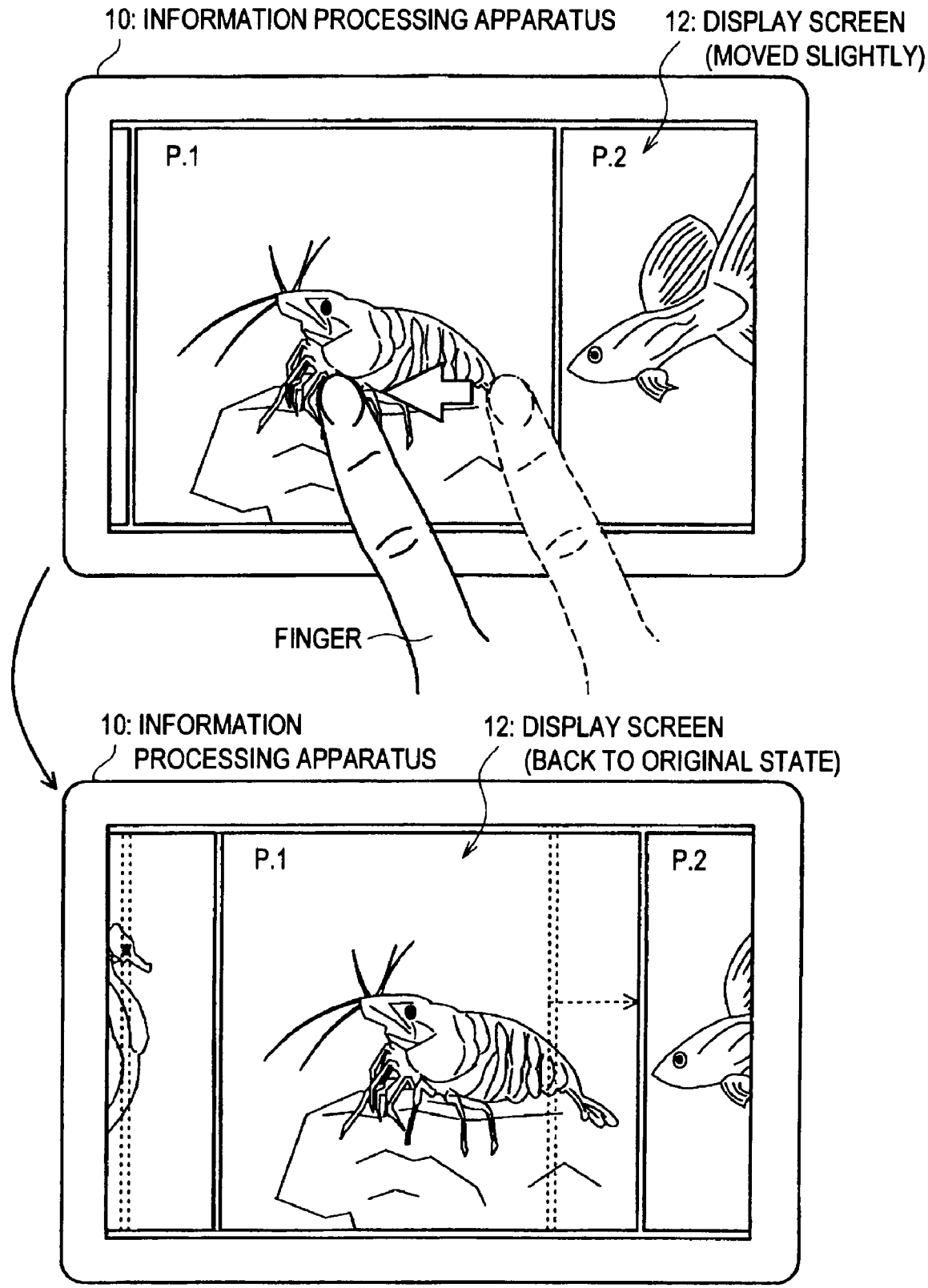
FIG. 1 is an explanatory view showing a movement method of a display object using a touch panel.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

Here, the flow of description of an embodiment of the present invention described below will briefly be mentioned. First, a movement operation of a general display object using a touch panel and a display control method will be described with reference to FIG. 1 and FIG. 2 by citing concrete examples. In a description thereof, what the embodiment of the present invention is intended will be described. Next, a display configuration of an information processing apparatus 100 according to an embodiment of the present invention and a vibration control method will be described with reference to FIG. 3 and FIG. 4 by citing concrete examples.

Next, a control pattern of the vibration amount according to the vibration control method in the present embodiment will be described with reference to FIG. 5 and FIG. 6 by citing concrete examples. Next, the function configuration of the information processing apparatus 100 according to the present embodiment will be described with reference to FIG. 7. In a description thereof, the correspondence between a technical configuration described with reference to FIG. 3 to FIG. 6 and a function configuration of the information processing apparatus 100 will also be described. In addition, a hardware configuration example capable of realizing functions of the information processing apparatus 100 according to the present embodiment will be described with reference to FIG. 8. Lastly, operation effects achieved by the technical configuration according to the present embodiment will be outlined.

[Purpose]

Figure 2:
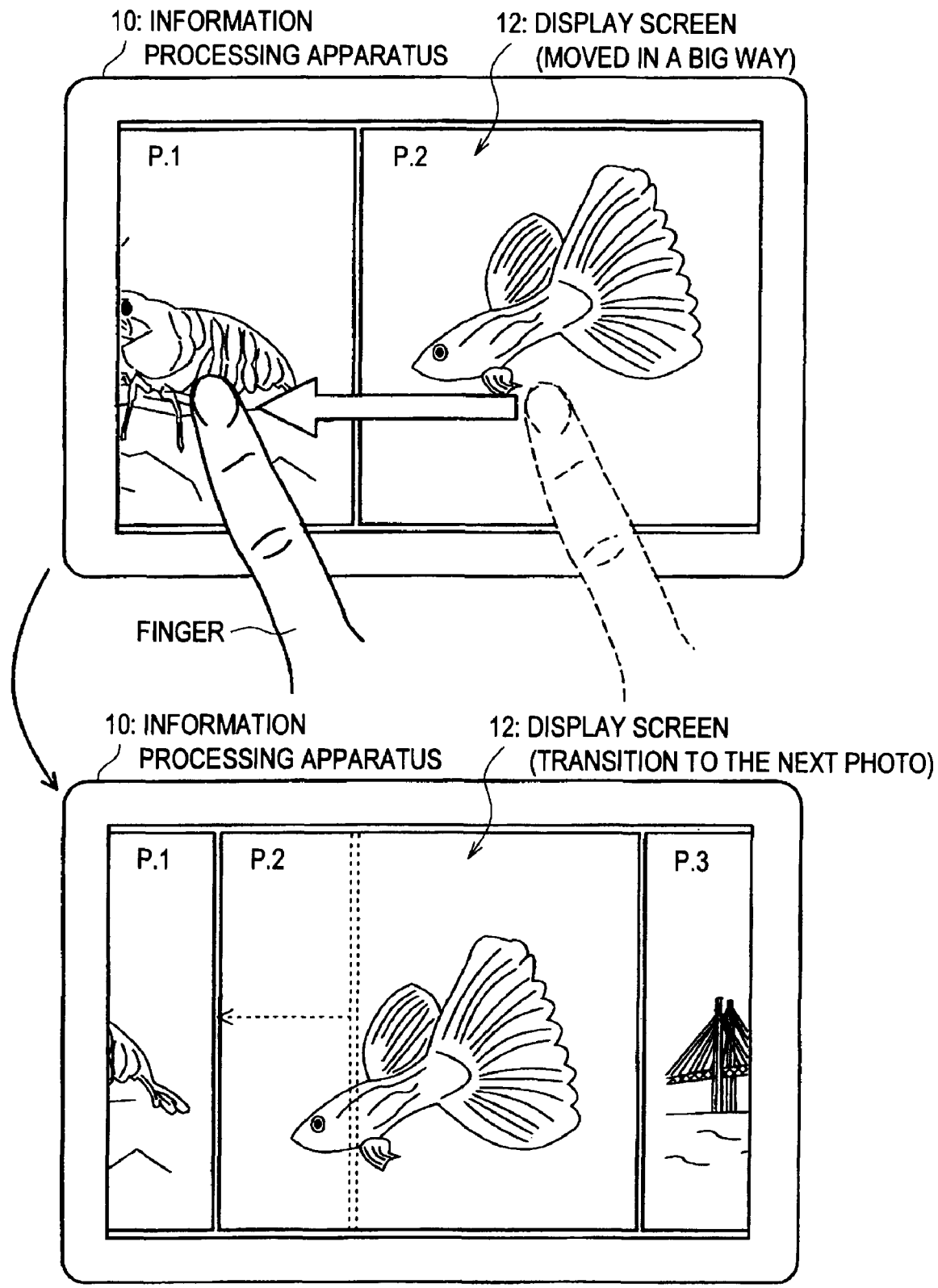
FIG. 2 is an explanatory view showing the movement method of the display object using the touch panel.

Before starting a description of an embodiment of the present invention, a movement operation of a general display object using a touch panel and a display control method will briefly be described with reference to FIG. 1 and FIG. 2. FIG. 1 and FIG. 2 are explanatory views exemplifying the movement operation of a general display object using a touch panel and the display control method. Processing shown here is realized, for example, by an information processing apparatus 10 provided with a display screen 12 having a touch panel function.

First, FIG. 1 is referenced. FIG. 1 shows an operation screen of a photo viewer used for perusing photo data. The photo viewer illustrated in FIG. 1 is configured in such a way that a plurality of pieces of photo data is arranged in a predetermined direction and the focus can be moved to a preceding photo or following photo by a slide operation of a finger along a predetermined direction being performed by a user. If, for example, the next photo arranged on the right side should be focused and displayed, the user may perform a slide operation of a finger in the left direction on the display screen 12. At this point, the photo viewer provides resistance to the user during the slide operation.

The resistance during the slide operation here expresses, for example, one of phenomena daily encountered in ordinary life (hereinafter, daily phenomena). Daily phenomena in daily life include, for example, a ball flying a great distance with great force after being thrown away with all one's strength and an extended rubber band contracts to its original state after being let go of one's hold. In addition, it is also one of daily phenomena that while it is difficult to move a heavy object, a light object can be moved even with a weak force. Moreover, though a simple example, the fact that an object that is not moved when pushed by one person is moved when pushed by two persons is considered to be one of daily phenomena. These daily phenomena are based on physical phenomena (or physical laws).

On the other hand, behavior of consumer goods in daily life is sometimes daily phenomena. An umbrella that can be operated to open by a single button worked by a spring, for example, is a good example thereof. When the umbrella is folded, the user pulls a gripping member toward a handle with strong force until a fitting portion provided in the gripping member is put on a hook of the handle. If the pulling force is weak, the umbrella will open again due to resistance force of the spring. As a similar example, for example, many people may have experienced that because a door is not completely pulled to an open state, the door is not fixed in the open state and is immediately closed. By experiencing such scenes, the user recognizes that, for example, if a predetermined operation is performed with a strong force or to the end, an intended operation is completed and, if a predetermined operation is performed with a weak force or halfway, a state before the operation is brought back as daily phenomena.

The two examples cited here show "resistance" experienced daily by the user. Such "resistance" can be expressed, for example, by feedback of graphics shown in FIG. 1 and FIG. 2.

FIG. 1 shows a state in which the user slides a finger a little to move the display position of a photo. If the user performs a slide operation in a state in which a photo P.1 is displayed in the center, the photo P.1 moves in the slide direction by a distance of the slide operation. It is assumed, however, that the slide distance is shorter than a predetermined threshold. If the user moves the finger away from the display screen 12 after the slide operation, the information processing apparatus 10 determines that the slide distance is short and performs processing to bring the photo P.1 back to the original display position in which the photo P.1 is displayed in the center. That is, if the slide distance is short, the display arrangement of a photo will not be updated even if a slide operation is performed.

FIG. 2 shows a state in which the user slides the finger considerably to move the display position of a photo. If the user performs a slide operation in a state in which the photo P.1 is displayed in the center, the photo P.1 moves in the slide direction by a distance of the slide operation. However, it is assumed that the slide distance is larger than the predetermined threshold. If the user moves the finger away from the display screen 12 after the slide operation, the information processing apparatus 10 determines that the slide distance is long and performs processing to cause a transition to the display position in which a next photo P.2 is arranged in the center. That is, if the slide distance is long, the display screen 12 will be updated to a display configuration in which photos are arranged so that the next photo is focused in accordance with the slide operation.

See what kind of sense feedback by graphics shown in FIG. 1 and FIG. 2 gives to the user. As mentioned above, the user unconsciously perceives various daily phenomena on the basis of experience of the user. The above umbrella and door are such examples. The user also perceives daily phenomena concerning an operation means such as a button provided in electronic devices. A phenomenon in which unless a button is pressed deep enough, associated processing will not be performed can be cited as an example. In this case, the user perceives whether the button is pressed deep enough by relying on a touch of the button. Thus, if the user feels that the button is not pressed deep enough, the user may perform an operation to re-press the button or the like.

However, in an operation system realized by a linked operation of a slide operation of a finger in contact with a touch panel and movement of an object displayed in the display screen 12, there is little chance that the user executes something relying on "touch". Even in such an operation system, the user can naturally move graphics or press a displayed button. However, no feedback of sense or touch is given to the user. Thus, the user will perform the next operation or determine whether to continue or suspend the operation after checking an operation result.

Therefore, if an operation system that behaves relatively closely to daily phenomena perceived unconsciously by the user can be realized, the operation feeling of the user can still be improved because there is no need to perform the next operation after checking an operation result. Further, it is expected that such an improved operation feeling brings a reduction of misoperations and improvement of operating speeds.

In the example shown in FIG. 1 and FIG. 2, behavior close to daily phenomena that if the slide distance is short, the original display arrangement is brought back is realized and thus, the user can visually experience a natural operation feeling. "Resistance" is expressed in the example, but, for example, "strength of force", "inertia" and the like may also be expressed.

However, when visually expressed, if an object (for example, a photo) is hidden by a finger, no "touch" will be conveyed to the user. Moreover, even if such an expression mode is used, the system is nevertheless an operation system in which an operation is performed after visually checking an operation result and thus, no particularly advantageous effect for the user's operation feeling is achieved. In consideration of the above points, realization of a technology that conveys information about data to the user by any mechanism other than vision is sought after. An embodiment described below is intended for realization of such a technological request.

Embodiment

An embodiment of the present invention will be described below. The present embodiment relates to a technology that gives vibration as feedback by being linked to a display operation of graphics. More specifically, the present embodiment relates to a technology that provides an operation system having more intuitive expressions to the user by controlling the vibration amount in accordance with the parameter amount of data associated with graphics. That is, in contrast to a simple technology to report completion of a processing operation or the contact position to the user through vibration, the technology provides a "touch" through vibration to the user by the vibration amount controlled based on information about an operation target.

[Vibration Control Method]

First, the vibration control method according to the present embodiment will be described with reference to FIG. 3 and FIG. 4.

Figure 3:
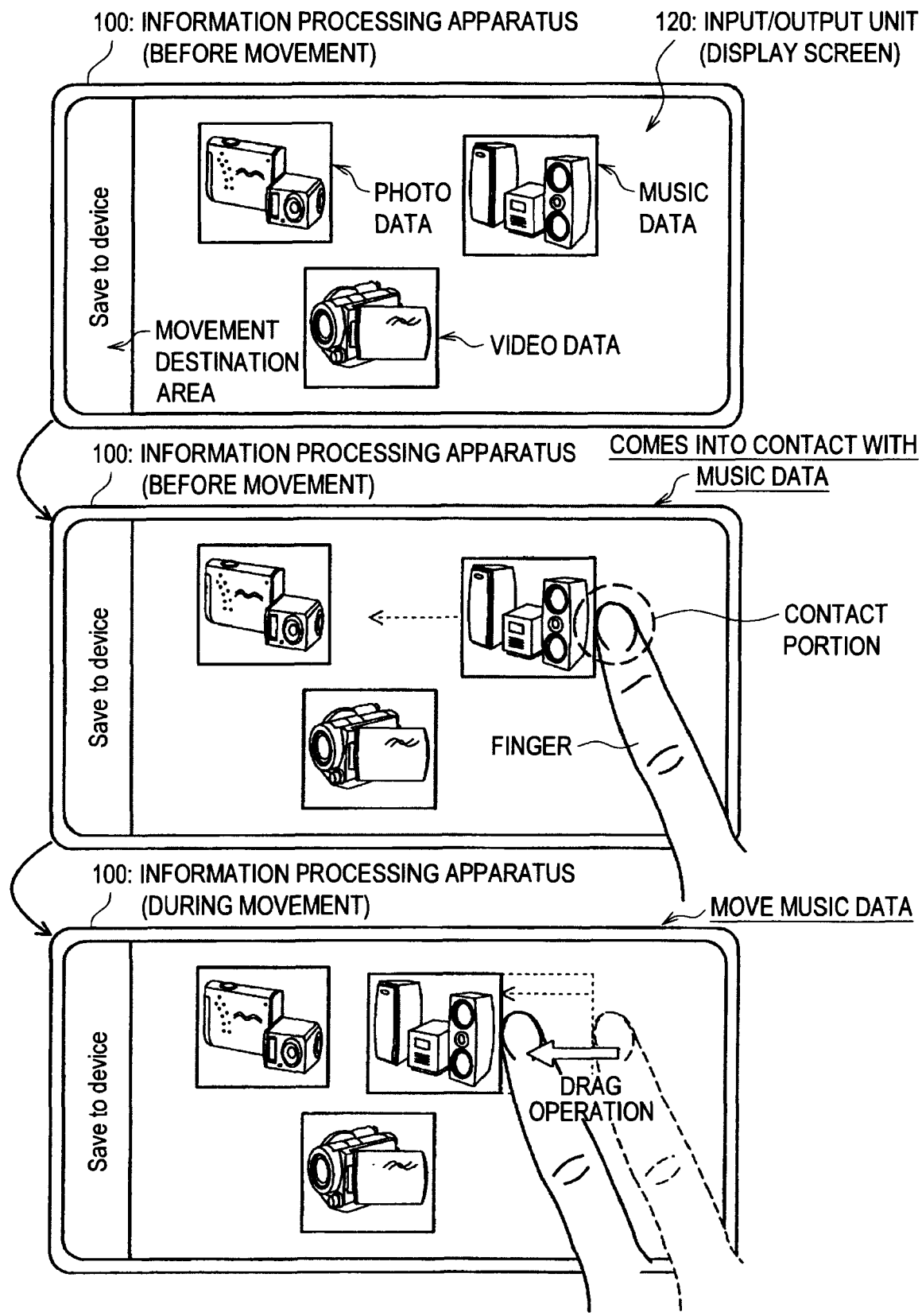
FIG. 3 is an explanatory view exemplifying the movement method of the display object according to an embodiment of the present invention and a vibration control method.

FIG. 3 is an explanatory view showing the vibration control method when one objects starts to move and while moving. FIG. 4 is an explanatory view showing the vibration control method when a plurality of objects collide and while moving. In a description that follows, an operation target associated with various kinds of data will be called a display object or simply an object. The display configuration illustrated in FIG. 3 and FIG. 4 and the vibration control processing are realized by the function configuration of the information processing apparatus 100 described later. Further, the display screen in which an object is displayed corresponds to an input/output unit 102 provided with the information processing apparatus 100 and is realized, for example, by a touch panel.

(Vibration Control when Object Moves)

FIG. 3 will be referenced. FIG. 3 shows, as an example, the display screen of the information processing apparatus 100 in which three objects are displayed. Each of the objects shown here is associated with photo data, music data, or video data. Naturally, objects associated with other kinds of data may be displayed in the display screen. Further, only one object may be displayed in the display screen, or two or four or more objects may be displayed. Moreover, a plurality of pieces of data may be associated with one object.

A movement destination area is also displayed in the screen of the information processing apparatus 100 illustrated in FIG. 3. The movement destination area is a display area showing a movement destination to which an object is moved. When an object is moved into the movement destination area, for example, data associated with the object will be saved in the information processing apparatus 100. In this case, the information processing apparatus 100 may be configured to acquire and save data associated with the object moved into the movement destination area from a content server or the like that delivers various kinds of data.

As another configuration, for example, the information processing apparatus 100 may be configured to record associated with an object in a predetermined external storage device when the object is moved into the movement destination area. Further, in addition to data storage and recording, various functions may be allocated to the movement destination area. For example, a function to upload data corresponding to the object moved into the movement destination area in a device such as a server connected to the information processing apparatus 100 by wire or by radio may be allocated to the movement destination area. Alternatively, a function to discard data corresponding to the object moved into the area may be allocated to the movement destination area.

Thus, any function may be allocated to the movement destination area. However, in a description that follows, a configuration in which data of an object moved into the movement destination area is saved in the information processing apparatus 100 is taken as an example for the sake of convenience of description. Further, an operation by the user to move an object of music data and behavior of the information processing apparatus 100 in response to the operation will be described.

First, the user touches a position in the screen where the object of music data is displayed by a finger. Hereinafter, the position where the user is in contact will be called a contact portion. Further, the user moves the finger in the left direction while the finger is in contact with the object of music data to move the object of music data toward the movement destination area. It is assumed here that the movement destination area is arranged on the left side when viewed from the position where the object of music data is displayed.

When a slide operation described above is performed, the display position of the object of music data is moved by the information processing apparatus 100 accompanying the slide operation of the contact portion. That is, the object of music data is moved by being linked to the slide operation of the user.

When the object of music data is moved, vibration is provided to the finger (contact portion) of the user in contact with the object of music data by the information processing apparatus 100. However, the vibration amount of vibration provided to the finger of the user is decided depending on the parameter amount of music data associated with the moved object. As the parameter amount, for example, the data size, reproduction time, reproduction frequency, number of pieces of music, or price of music data can be considered.

If the type of data associated with the object is photo data, for example, the data size, photo size, how old the photographing date/time, display frequency, editing frequency, or price of photo data is used as decision factors of the vibration amount. Further, if the type of data associated with the object is video data, for example, the data size, reproduction time, how old the photographing date/time, number of chapters, viewing frequency, editing frequency, or price of video data is used.

The vibration amount may be configured to be decided based on the moving distance, moving direction, or movement speed when the object is moved. Further, the vibration amount may be configured to be different in accordance with the type of data associated with the object. Naturally, the vibration amount may be configured to be set by combining a plurality of these arbitrary decision factors. In a description that follows, the above arbitrary decision factors will generically be called the parameter amount of data.

With the vibration amount determined as described above, the user can grasp the parameter amount of data associated the object being moved in accordance with the vibration amount received from the contact portion. In this case, even if the object and display information related thereto are hidden by the finger or the like, the user can reliably perceive the parameter amount of data. Incidentally, mobile electronic devices are frequently carried in a bag or pocket and operated directly in such a state without the display screen thereof being viewed. In such a case, more correct operations are realized by information about data to be operated being obtained through vibration, contributing significantly to improved operability.

(Expression 1 of Static Friction Force)

Further, in the present embodiment, a contrivance shown below is performed regarding vibration control during movement of an object to realize one of the above "daily phenomena" through vibration. The "daily phenomenon" illustrated here is a static friction force generated when an object is moved. When, for example, a static object put on a floor is moved by pushing, friction is generated between the object and the floor. Thus, in order to move the static object by pushing, it is necessary to add thrust against a friction force acting between the static object and the floor. The friction force can be divided into a static friction force and a dynamic friction force. The static friction force is a friction force acting before a static object starts to move. The dynamic friction force is a friction force acting after a static object starts to move.

The static friction force is greater than the dynamic friction force. Thus, the user finds a static object very heavy before the static object starts to move and relatively light after the static object starts to move. In the present embodiment, as an example, a technique to express such a "static friction force" as a vibration amount is proposed. In the example in FIG. 3, the object of music data is touched by the user and while the object is moved by a predetermined distance, the contact portion is vibrated with a relatively large vibration amount. After the object is moved by the predetermined distance, vibration in the contact portion is controlled to a relatively small vibration amount. The predetermined distance can be decided arbitrarily. The vibration amount may be switched instantaneously when the moving distance of the object reaches the predetermined distance or switched so that the vibration amount decreases gradually.

By expressing a static friction force as described above, the process of transition from a resting state to a moving state is expressed in a form almost matching the "daily phenomena" and the user can perceive an operation of "data" movement by likening to an operation of daily "object" movement. The user can also perceive the position where movement is started by touching an object more clearly.

Consider, for example, a situation in which the user traces the screen from right to left with a finger without checking the display position of an object. If the above configuration expressing a static friction force should not be used, vibration is generated with a predetermined vibration amount in the contact portion from the position where the finger of the user touches the object. In this case, the user will perceive the instant when vibration is started as the instant of starting movement. However, a human sense is relatively insensitive. If the instant of starting movement is a trigger of starting processing of some kind, the probability of occurrence of misoperations increases with such a configuration. If, for example, reproduction/stop/start location and the like of music are controlled in accordance with the movement operation of an object, the configuration of "static friction force" in which the instant of starting movement of the object can be perceived more accurately is more suitable.

(Expression of Graphics Accompanying Static Friction Force)

With a static friction force expressed as described above, a "sense" similar to "daily phenomena" can be provided to the user and an effect thereof can further be enhanced by adding a expression by graphics. When, for example, as shown in FIG. 3, an object in a resting state is moved, the object does not move immediately after the finger comes into contact with the object and the object moves after the finger is moved for some time. Further, while the object rests without being moved after the finger comes into contact, the contact portion vibrates with a relatively large vibration amount.

With movement and the vibration amount of an object controlled by being linked in this manner, the "daily phenomenon" of "it is difficult to move a static object" is expressed and a more realistic "sense" is provided to the user. Moreover, with an increasingly heavier file (for example, a file having a larger data size) expressed by a heavier operation (more difficult to move) in the screen, a more realistic expression mode is realized. Even with an operation system such as a touch panel, a more realistic operation feeling can be provided to the user by providing a sense similar to a phenomenon in a real world to the user by vibration conveyed to the finger and visual information being linked.

(Vibration Control when a Plurality of Objects are Moved)

Figure 4:
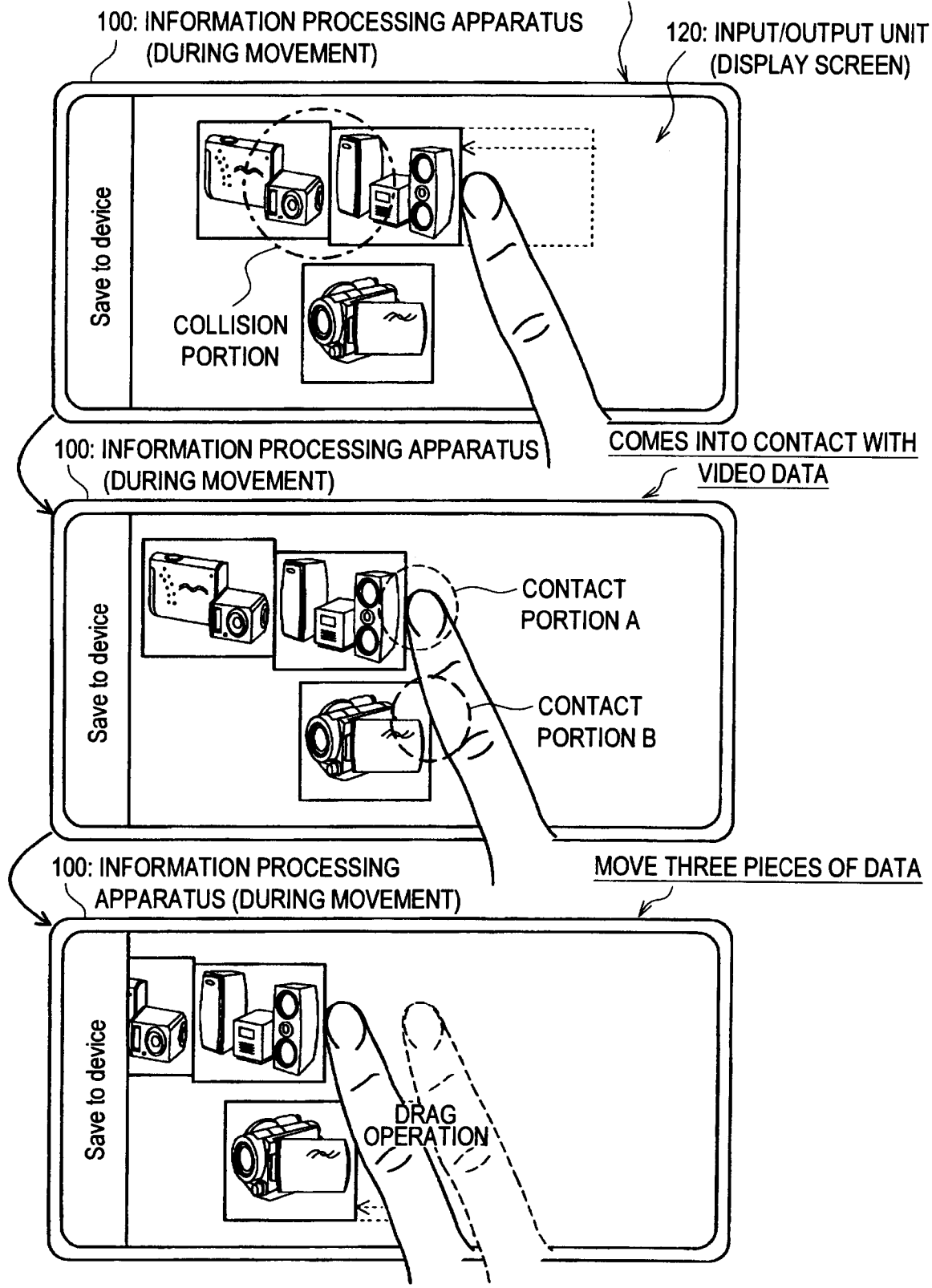
FIG. 4 is an explanatory view exemplifying the movement method of the display object according to the present embodiment and the vibration control method.

Next, FIG. 4 will be referenced. FIG. 4 shows the display configuration in which a plurality of objects is moved together. As shown in FIG. 3, a situation in which the object of music data is moved by the user is considered as an example. First, the vibration control method when the object of music data collides against that of photo data during movement thereof will be described. It is assumed, however, that the user continues the drag operation after the collision.

(Movement of the Plurality of Objects by Collision of Objects)

If, as shown in FIG. 4, the object of music data collides against that of photo data, the object of photo data starts to move together with that of music data. In the example in FIG. 4, the object of music data and that of photo data are drawn in such a way that collision portions thereof do not overlap for the sake of convenience of description, but a part or all of the collision portions may overlap. Even if the object of music data and that of photo data are drawn in such a way that collision portions thereof overlap so that the object of photo data is completely hidden, the user can easily determine whether a plurality of objects overlap by using a control method of the vibration amount described later.

When the object of music data and that of photo data are moved together, the vibration amount of vibration provided to the finger of the user is determined based on the total parameter amount of both objects. If, for example, the data size is used as the parameter amount, the vibration amount is determined in accordance with the total data size of the data size of music data and that of photo data.

Thus, the user can determine whether objects have collided without viewing the display screen. Moreover, as described above, even in a display configuration in which a plurality of objects is displayed by being overlapped, the user can easily determine whether moving objects overlap. Further, the user can obtain an operation feeling matching "daily phenomena" that "moving a plurality of objects needs a great force". Therefore, the operation feeling is improved to be more realistic.

(Expression 2 of Static Friction Force)

Further, an effect of static friction force at the instant of collision may also be expressed by vibration. In the example in FIG. 4, the object of photo data on the receiving side of collision rests. For example, the effect can be expressed so that a static friction force acts on the object of photo data.

In this case, for example, a friction force obtained by adding a static friction force acting on the object of photo data to a dynamic friction force acting on the object of music data is expressed by vibration. Alternatively, a friction force obtained by adding a static friction force acting on the object of photo data to a static friction force acting on the object of music data may be expressed by vibration. In addition, the period in which a static friction force acts may be shortened to express an effect of impulse given to the object of photo data when the object of music data collides.

Using the above expressions, the user can clearly perceive the instant when objects collide. Further, the user can perceive whether a "light" object collides against a "heavy" object or a "heavy" object collides against a "light" object as a "sense". Expressions "heavy" and "light" here correspond to a "large" and "small" parameter amount of data associated with the object thereof respectively. By controlling vibration as described above, a more intuitive operation feeling can also be provided to the user when a drag operation of a plurality of objects is performed simultaneously.

(Movement of a Plurality of Objects by a Finger Touch)

In the above example, the display configuration and vibration control method when a plurality of objects collides and both objects are moved together have been described. An operation example in which a drag operation of a plurality of objects is performed simultaneously includes, for example, a situation in which a plurality of objects is in contact with the finger of the user. FIG. 4 shows a situation in which the finger of the user comes into contact with a video object while the objects of music data and photo data are moved.

In this example, the finger of the user is in contact with the object of music data through a contact portion A and the object of video data through a contact portion B. In this case, the information processing apparatus 100 provides vibration of the vibration amount corresponding to "music data+photo data" to the contact portion A and vibration of the vibration amount corresponding to "video data" to the contact portion B. When the contact portion B comes into contact with the object of video data, like the object of music data, "static friction" is expressed for the contact portion B by the vibration amount and operation by graphics. If the drag operation is continued after the object of video data comes into contact through the contact portion B, the objects of music data, photo data, and video data are moved together. Then, after being moved into the movement destination area, data of the objects is saved in the information processing apparatus 100.

The above example shows a case in which individual positions corresponding to contact portions vibrate, but the whole finger of the user or the whole cabinet of the information processing apparatus 100 may vibrate. In this case, the vibration amount is decided based on the total parameter amount of objects in contact with the finger of the user or objects being moved together. By adopting such a configuration, the user can perceive the resting state, moving state, collision state, number of objects being moved, and parameter amounts of data corresponding to objects without visually checking objects displayed in the screen. At this point, the user can perceive a "sense" similar to "daily phenomena" during operation and thus, a more intuitive operation becomes possible.

[Setting Example of Vibration Amount]

Here, a setting example of the vibration amount according to vibration control method will be described with reference to FIG. 5 and FIG. 6. FIG. 5 is a graph showing changes of the vibration amount in the process of operations of the user shown in FIG. 3 and FIG. 4. FIG. 6 is an explanatory view showing a portion of the graph shown in FIG. 5 in a magnified view.

(Overall Flow)

Figure 5:
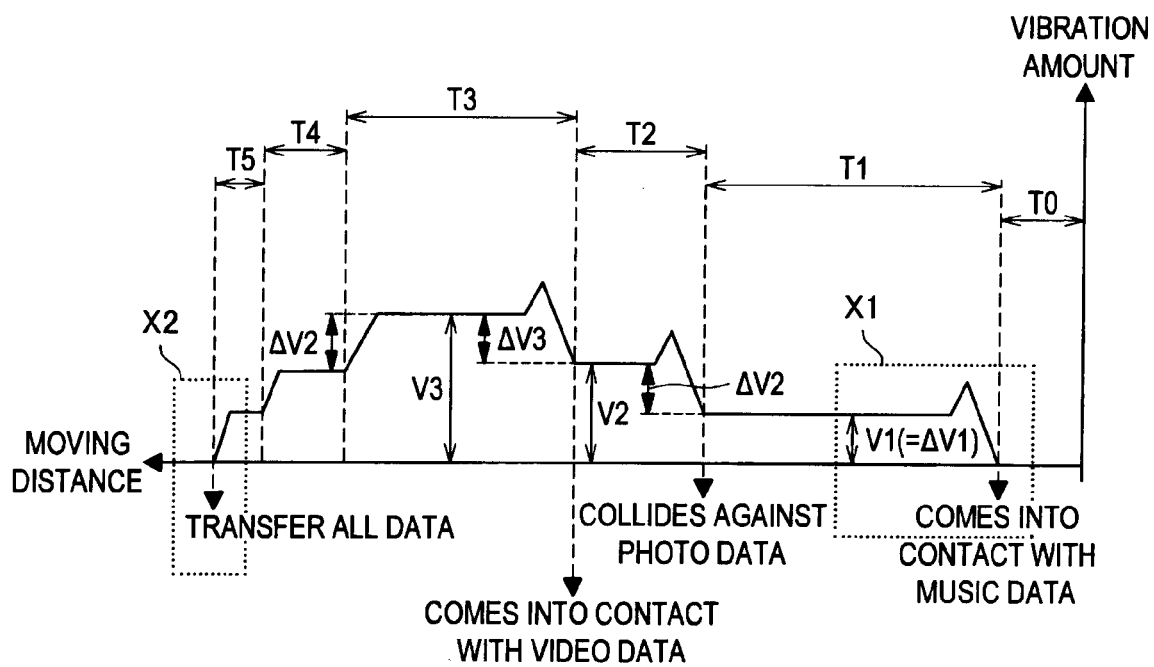
FIG. 5 is an explanatory view exemplifying the vibration control method according to the present embodiment.

FIG. 5 will be referenced. In the graph shown in FIG. 5, the horizontal axis expresses the moving distance and the vertical axis expresses the vibration amount. Also in the graph shown in FIG. 5, the period before coming into contact with the object of music data is denoted as T0 and that before the object comes into contact with the object of photo data as T1 to match the process of user operations shown in FIG. 3 and FIG. 4. Further, the period before the finger of the user comes into contact with the object of video data is denoted as T2.

Then, the period before the object of photo data is moved into the movement destination area is denoted as T3, that before the object of music data is moved into the movement destination area as T4, and that before the object of video data is moved into the movement destination area as T5. Objects are assumed here to be moved into the movement destination area in the order of photo data, music data, and video data. The vibration amount corresponding to the parameter amount of music data is denoted as $\Delta V1$ (=V1), that corresponding to the parameter amount of photo data as $\Delta V2$ (=V2−V1), and that corresponding to the parameter amount of video data as $\Delta V3$ (=V3−V2).

Here, V1 is the vibration amount in the period T1, V2 the vibration amount in the period T2, and V3 the vibration amount in the period T3. The vibration amount in the period T0 before the finger of the user comes into contact with the object of the music data is 0. Next, when the finger of the user comes into contact with the object of the music data, the vibration amount becomes temporarily larger than V1, stabilizes to the vibration amount V1 after moving a predetermined distance, and vibration continues with the vibration amount V1 until the end of the period T1. Here, a region X1 where the vibration amount becomes temporarily larger than V1 is a portion where the above "static friction" is expressed. This portion will be described later with reference to FIG. 6.

Next, when the object of music data collides against that of photo data, the vibration amount becomes temporarily larger than V2, stabilizes to the vibration amount V2 after moving a predetermined distance, and vibration continues with the vibration amount V2 until the end of the period T2. At this point, the vibration amount V2 is a total value of the vibration amount ΔV1 corresponding to the parameter amount of music data and the vibration amount ΔV2 corresponding to the parameter amount of photo data. The vibration amount V2 may, however, be determined based on a total parameter amount obtained by totaling the parameter amount of music data and that of photo data.

Next, when the finger of the user comes into contact with the object of video data, the vibration amount becomes temporarily larger than V3, stabilizes to the vibration amount V3 after moving a predetermined distance, and vibration continues with the vibration amount V3 until the end of the period T3. In this example, the vibration amount ΔV3 is set to a value obtained by totaling vibration amount V2 and the vibration amount ΔV3 corresponding to the parameter amount of video data. When vibration is provided to each contact portion (the contact portion A, the contact portion B) in contact with each object, as described above, the contact portion A is vibrated with the vibration amount V2 and the contact portion B with the vibration amount ΔV3.

Next, when the object of photo data is moved into the movement destination area, the vibration amount is reduced by the vibration amount ΔV2 corresponding to the parameter amount of photo data. Further, when the object of music data is moved into the movement destination area, the vibration amount is reduced by the vibration amount ΔV1 corresponding to the parameter amount of music data. Lastly, when the object of video data is moved into the movement destination area, the vibration amount is reduced to 0. However, the vibration amount is reduced gradually in the process of transition from the period T3 to the period T4, that of transition from the period T4 to the period T5, and that of ending the period T5. This will be described later by taking a region X2 showing the process of ending the period T5 as an example with reference to FIG. 6.

(Static Friction and Gradual Decrease of Vibration Amount)

Figure 6:
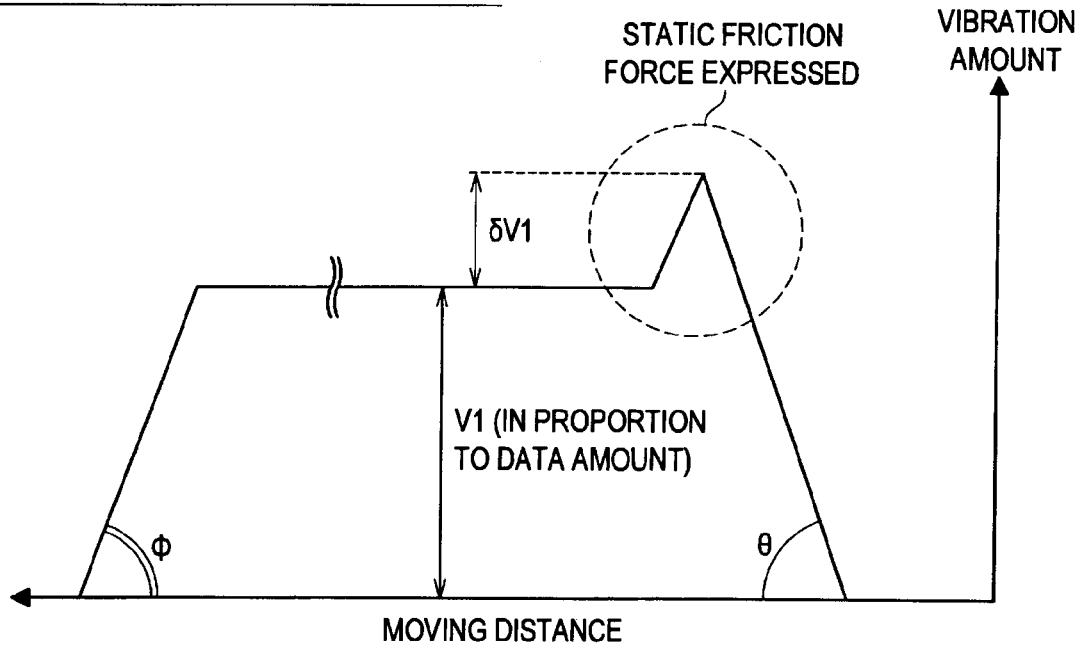
FIG. 6 is an explanatory view exemplifying the vibration control method according to the present embodiment.

FIG. 6 will be referenced. FIG. 6 shows the region X1 corresponding to the start portion of the period T1 and the region X2 corresponding to the end portion of the period T5 in the graph of FIG. 5 by enlarging these regions. First, the expression of "static friction" will be described again with reference to the portion of the region X1. Further, the expression "increase the vibration amount gradually" observed in the start portion of the period T1 will be described. Next, the expression "decrease the vibration amount gradually" will be described with reference to the portion of the region X2. However, a detailed description of content overlapping with that described above is omitted.

When a static object is moved, as described above, a vibration amount larger than that during movement of the object is provided to the finger of the user while the finger moves a predetermined distance from the start of movement to express "static friction". In the example in FIG. 6, the vibration amount larger than the vibration amount V1 (=ΔV1) during movement by δV1 is allocated to express "static friction". The vibration amount δV1 may arbitrarily be decided in advance, but may be decided, for example, based on the parameter amount of data associated with an object. This also applies to the start portions of the period T2 and the period T3 of the graph shown in FIG. 5. In this manner, "static friction" is expressed.

Next, the expression "increase the vibration amount gradually" will be described. As illustrated in FIG. 6, the vibration amount gradually increases while the object being moved. Graphically expressed, the inclination to increase the vibration amount is expressed as θ<90°. The information processing apparatus 100 may naturally be configured so that θ=90° applies, but how a force applied to a static object is gradually accumulated can be expressed by vibration by setting as θ<90°.

Next, the expression "decrease the vibration amount gradually" will be described. This expression is common to the end portions of the period T3, the period T4, and the period T5. As shown in FIG. 6, the ratio of objects moved into the movement destination area can be expressed by setting an inclination φ. Actually, data is frequently stored in the information processing apparatus 100 after all objects being moved into the movement destination area. However, to express the ratio of objects that have been moved into the movement destination area, the vibration amount decreases in accordance with the ratio of objects that have been moved into the movement destination area by setting an inclination φ. Therefore, while the graph is linear in the example shown in FIG. 5 and FIG. 6, the graph may actually be curved in accordance with movement of the finger of the user.

Thus, the graphs in FIG. 5 and FIG. 6 are configured so that resistance is strong the instant at which the finger comes into contact with an object and becomes weaker after the finger is moved for some time. This configuration expresses a static friction coefficient and a dynamic friction coefficient and also a phenomenon that when an object is moved in a real world, a force is necessary at first and the object can be moved with weaker force after the object starts to move. Further, a difference in height of the graph expresses, for example, the file size. In this case, if the file size is larger, changes in height increase and larger vibration is given to the user as feedback. Such expressions express a phenomenon that a greater force is necessary to move a heavier object.

By expressing, as described above, resistance, friction, weightiness and the like obtained as experience in a real world by vibration, in addition to the expression by graphics, a more intuitive operation system is realized. Moreover, even if graphics is hidden by the finger performing an operation, feedback can be given to the user by vibration.

[Function Configuration of Information Processing Apparatus 100]

Figure 7:
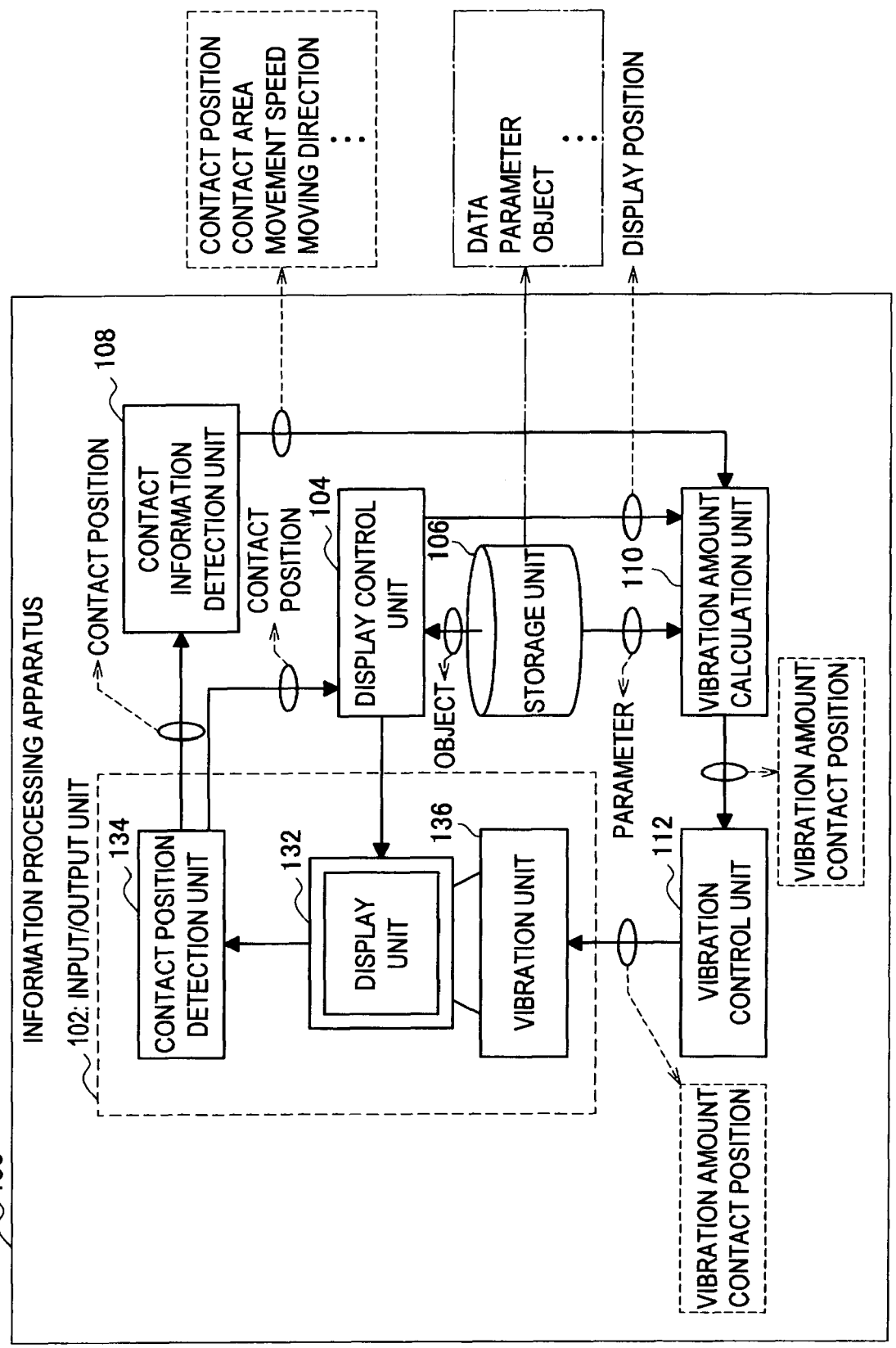
FIG. 7 is an explanatory view showing a function configuration example of an information processing apparatus according to the present embodiment.

Next, the function configuration of the information processing apparatus 100 according to the present embodiment will be described with reference to FIG. 7. FIG. 7 is an explanatory view showing the function configuration of the information processing apparatus 100 capable of realizing the display configuration and vibration control method described above.

As shown in FIG. 7, the information processing apparatus 100 mainly includes the input/output unit 102, a display control unit 104, a storage unit 106, a contact information search unit 108, a vibration amount calculation unit 110, and a vibration control unit 112.

The function of the input/output unit 102 is realized by an input unit 916 and an output unit 918 of the hardware configuration shown in FIG. 8. The functions of the display control unit 104, the contact information search unit 108, the vibration amount calculation unit 110, and the vibration control unit 112 are realized by a CPU 902 based on programs recorded in a ROM 904, a RAM 906, a storage unit 920, a removable recording medium 928 and the like.

(Input/Output Unit 102)

The input/output unit 102 includes a display unit 132, a contact position detection unit 134, and a vibration unit 136. More specifically, the input/output unit 102 is a touch panel or the like having a vibration function. The display unit 132 constitutes the display screen of the information processing apparatus 100. Display content of the display unit 132 is controlled by the display control unit 104. The display unit 132 displays, for example, objects corresponding to music data or image data, the movement destination area and the like. Further, the display unit 132 displays an operation screen of an application to reproduce music data, that of the photo viewer, or photos therein.

The contact position detection unit 134 is connected to the display unit 132 and the position in the screen of the display unit 132 touched by the user is detected by the contact position detection unit 134. That is, the display unit 132 constitutes a touch panel or the like by being combined with the contact position detection unit 134. Information about the contact position detected by the contact position detection unit 134 is input into the display control unit 104 and the contact information search unit 108. The vibration unit 136 is also connected to the display unit 132 and vibration is provided to the user by the vibration unit 136 in accordance with movement of an object displayed in the screen of the display unit 132.

The vibration unit 136 may be configured to be able to provide vibration to a contact position detected by the contact position detection unit 134 by pinpointing the contact position. The vibration unit 136 may also be configured to vibrate the display unit 132 or the whole cabinet of the information processing apparatus 100. The vibration unit 136 provides vibration to the user based on vibration control information input from the vibration control unit 112. The vibration control information contains, for example, information of the vibration amounts and contact positions to be vibrated.

(Display Control Unit 104)

The display control unit 104 reads objects and the like stored in the storage unit 106 and, as shown in FIG. 3 and FIG. 4, causes the display unit 132 to display objects associated with various kinds of data and the movement destination area. That is, the display control unit 104 manages position information of each object in the screen and that of the movement destination area. The display control unit 104 also moves objects based on information about contact positions input from the contact position detection unit 134. Further, the display control unit 104 determines objects that have collided based on spatial relationships among a plurality of objects to move objects that have collided together. Position information managed by the display control unit 104 is input into the vibration amount calculation unit 110 each time the position or the like of an object is updated. The display control unit 104 can also give feedback to the user by graphics by being linked to vibration control described later.

(Storage Unit 106)

The storage unit 106 has objects displayed in the display unit 132 and data associated the objects stored therein. Further, the storage unit 106 has the parameter amount held by each piece of data stored therein. That is, each object, data, and the parameter amount are associated and stored in the storage unit 106. Objects stored in the storage unit 106 are read by the display control unit 104 before being displayed in the display unit 132. Parameter amounts stored in the storage unit 106 are read by the vibration amount calculation unit 110 before being used for calculation processing of vibration amounts.

(Contact Information Search Unit 108)

The contact information search unit 108 detects the moving direction and movement speed of a contact position or the contact area based on information (for example, coordinates) of the contact position input from the contact position detection unit 134. Such information can be calculated based on information about the contact position successively input from the contact position detection unit 134. The contact information search unit 108 may also be configured to detect the number of fingers in contact with the display unit 132. Information detected by the contact information search unit 108 is input into the vibration amount calculation unit 110 together with information about the contact position.

(Vibration Amount Calculation Unit 110)

The vibration amount calculation unit 110 has information about the contact position of an object input thereinto from the display control unit 104 and information such as the contact position, contact area, movement speed, and moving direction input thereinto from the contact information search unit 108. Further, the vibration amount calculation unit 110 can read the parameter amount of data associated with each object from the storage unit 106. Then, the vibration amount calculation unit 110 uses the above information to calculate a vibration amount of vibration to be provided to the user. More specifically, the vibration amount like the graphs shown in FIG. 5 and FIG. 6 is calculated in accordance with the user operation.

First, the vibration amount calculation unit 110 determines whether any contact position is present. If no contact position is present, the vibration amount calculation unit 110 input the vibration amount 0 into the vibration control unit 112. If, on the other hand, any contact position is present, the vibration amount calculation unit 110 determines whether the moving distance after coming into contact is shorter than a predetermined distance. If the moving distance is shorter than the predetermined distance, the vibration amount calculation unit 110 calculates a vibration amount expressing a static friction coefficient based on the parameter amount of data corresponding to the contacted object and inputs the vibration amount into the vibration control unit 112. If, on the other hand, the moving distance is longer than the predetermined distance, the vibration amount calculation unit 110 calculates a vibration amount expressing a dynamic friction coefficient based on the parameter amount of data corresponding to the contacted object and inputs the vibration amount into the vibration control unit 112.

Further, the vibration amount calculation unit 110 determines whether the contacted object has collided against another object based on information about the display positions of objects input from the display control unit 104. If the contacted object has collided, the vibration amount calculation unit 110 calculates, for example, a total parameter amount of both objects and then calculates a vibration amount based on the total parameter amount. If a plurality of contact positions is present, the vibration amount calculation unit 110 calculates a total parameter amount of an object corresponding to each contact position and an object against which the object has collided and then calculates a vibration amount based on the total parameter amount.

If information about the number of fingers is detected by the contact information search unit 108, the vibration amount calculation unit 110 calculates a vibration amount in such a way that the vibration amount decreases with an increasing number of fingers. If, for example, the number of fingers increases to two, the vibration amount decreases by half. In this manner, information about the calculated vibration amount is input into the vibration control unit 112 together with information about the contact position.

(Vibration Control Unit 112)

The vibration control unit 112 controls the vibration unit 136 contained in the input/output unit 102 in such a way that a contact position is vibrated with the vibration amount input from the vibration amount calculation unit 110. Thus, the vibration control unit 112 inputs contact positions and vibration control information including the vibration amount for each contact position into the vibration unit 136. However, the vibration control unit 112 may be configured to control the vibration unit 136 so that the whole display unit 132 or the whole cabinet of the information processing apparatus 100 vibrates. In this case, the vibration control unit 112 may be configured to input only the vibration amount as vibration control information into the vibration unit 136.

By adopting the configuration described above, the display configuration illustrated in FIG. 3 and FIG. 4 and the vibration control processing are realized and an operation system capable of providing an intuitive operation feeling to the user can be realized. For example, resistance, friction, weightiness and the like can be expressed by vibration. Moreover, it becomes possible to give feedback to the sense of touch of the user. As a result, a more intuitive operation system is realized by expressing experience in a real world by vibration. Even if graphics displayed in the screen is hidden by the finger that performs an operation, feedback is given to the user using vibration.

[Hardware Configuration (Information Processing Apparatus 100]

The function of each component held by the above apparatus can be realized, for example, by an information processing apparatus having the hardware configuration shown in FIG. 8 using a computer program to realize the above functions. FIG. 8 is an explanatory view showing the hardware configuration of an information processing apparatus capable of realizing the function held by each component of the above apparatus. The form of the information processing apparatus is arbitrary and, for example, forms of a mobile information terminal such as a personal computer, mobile phone, PHS (Personal Handy-phone System), and PDA (Personal Digital Assistant), a game machine, and various kinds of information home appliances are included therein.

As shown in FIG. 8, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program.

These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removal recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memorystick, or an SD memory card (Secure Digital memory card), or the like. As a matter of course, the removal recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, an SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wiredly or wirelessly connected network. For example, the Internet, a home-use LAN, infrared communication, broadcasting, satellite communication, or the like is used.

[Summary]

Lastly, the function configuration held by an information processing apparatus in the present embodiment and operation effects achieved by the function configuration will briefly be summarized.

First, the function configuration held by an information processing apparatus according to the present embodiment can be expressed as described below. The information processing apparatus has a display control unit and a vibration control unit described below. If a position in a screen where an object is displayed is moved while in contact, the display control unit moves the display position of the object in accordance with movement of the contact position. The vibration control unit vibrates the contact position with a vibration amount corresponding to a parameter amount of data associated with the object when the display position of the object is moved.

Thus, the information processing apparatus realizes an operation system according to a drag operation of objects displayed in the screen by the display control unit. Further, the information processing apparatus controls the vibration amount in accordance with the parameter amount of data associated with the object being moved through the vibration control unit to provide vibration with the vibration amount to a user. As a result, even if an object displayed in the screen is hidden by an operation means such as a finger, the user can perceive feedback from the information processing apparatus through vibration. Further, by perceiving the feedback through vibration, the user can know the size of parameter amount of data actually being moved. Moreover, the contact position of the user is vibrated and thus, the user can really feel the presence of object so that more intuitive operations are realized.

If the moving object comes into contact with another object displayed in the screen, the display control unit may be configured to cause the other object and the moving object to move together. In this case, the vibration control unit is configured to vibrate the contact position with the vibration amount in accordance with the total parameter amount of both objects moving together. By adopting such a configuration, it becomes possible for the user to perceive an increase/decrease of moving objects despite the display configuration in which a plurality of objects is superimposed for the display. Further, a phenomenon experienced in a real world that "a strong force is necessary to move a heavy object" is expressed by vibration and thus, a more intuitive operation system can be realized.

The vibration control unit may be configured to vibrate the contact position with the vibration amount larger that that during movement of the object for only a predetermined period when the object starts to move. By adopting such a configuration, "static friction" experienced in a real world is expressed by vibration and thus, a more intuitive operation system is realized.

The vibration control unit may be configured to vibrate the contact position with the vibration amount larger than that when both objects move together for only a predetermined period after the moving object comes into contact with the other object. By adopting such a configuration, even if a plurality of objects comes into contact, "static friction" experienced in a real world is expressed by vibration and thus, a more intuitive operation system is realized.

As the parameter amount, a period from an acquisition time or an update time of data associated with the object until the time when the object starts to move may be used. In this case, the vibration control unit is configured to vibrate the contact position with an increasing vibration amount as the period becomes longer. By adopting such a configuration, a phenomenon experienced in a real world that "an old object becomes less movable by being stuck" is expressed by vibration and thus, a more intuitive operation system is realized.

The parameter amount may be, for example, a data size of data associated with the object. As another example, the data may be video data or music data. In this case, a reproduction time of data associated with the object is used as the parameter amount. As still another example, the data may be image data. In this case, the image size of data associated with the object is used as the parameter amount. The data may contain a plurality of pieces of content. In this case, the number of pieces of content contained in the data is used as the parameter amount.

If a display screen is touched by a finger and the display position of the object is moved, the vibration control unit may be configured to change the vibration amount in accordance with the number of fingers brought into contact with the display screen. By adopting such a configuration, a phenomenon that a stronger force can be acted by using a plurality of hands can be expressed by vibration. The vibration control unit is configured, for example, to reduce the vibration amount when the number of fingers increases. By adopting such a configuration, a more intuitive operation system is realized.

It should be understood by those skilled in the art that various modifications, combinations, sub-combinations and alterations may occur depending on design and other factors insofar as they are within the scope of the appended claims or the equivalents thereof.

In the above description, a touch panel is assumed as an input means of the user, but the scope of technology according to the present embodiment is not limited to this. For example, the technology according to the present embodiment can be applied to a device combining a display device such as a display and an input device such as a touch pad. In this case, the display device does not vibrate and instead, the touch pad alone or the whole cabinet including the touch pad and the display device is configured to vibrate. Further, the form in which an object is operated by a user using a finger is assumed in the above description, but the scope of technology according to the present embodiment is not limited to this. For example, instead of the finger, a stylus pen may be used. While the display mode of an object is not described in detail in the above description, for example, graphics of an album jacket may be displayed as an object of music data. Further, a thumbnail image that reduces a photo and a scene of video may be displayed as the object of photo data or video data respectively. Thus, various modifications of the technology according to the present embodiment can be made.

The present application contains subjected matter related to that disclosed in Japanese Priority Patent Application JP 2008-172408 filed in the Japan Patent Office on Jul. 1, 2008, the entire contents of which is hereby incorporated by reference.

What is claimed is:

1. An information processing apparatus, comprising:
   a display control unit that moves a display position of an object in accordance with movement of a contact position when the position in a screen where the object is displayed is contacted and moved; and
   a vibration control unit that vibrates the contact position with a vibration amount in accordance with a parameter amount of data associated with the object when the display position of the object moves,
   wherein when the moving object comes into contact with another object displayed in the screen, the display control unit moves the other object and the moving object together, and
   the vibration control unit vibrates the contact position with the vibration amount in accordance with the total parameter of both objects moving together.

2. The information processing apparatus according to claim 1, wherein the vibration control unit vibrates the contact position with the vibration amount larger than that during movement of the object for only a predetermined period when the object starts to move.

3. The information processing apparatus according to claim 2, wherein the vibration control unit vibrates the contact position with the vibration amount larger than that when both objects move together for only a predetermined period after the moving object comes into the contact with the other object.

4. The information processing apparatus according to claim 1, wherein the parameter amount is a period from an acquisition time or an update time of data associated with the object until the time when the object starts to move, and
the vibration control until vibrates the contact position with an increasing vibration amount as the period becomes longer.

5. The information processing apparatus according to claim 1, wherein the parameter amount is a data size of data associated with the object.

6. The information processing apparatus according to claim 1, wherein the data is video data or music data, and
the parameter amount is a reproduction time of data associated with the object.

7. The information processing apparatus according to claim 1, wherein the data is image data;
the parameter amount is the image size of data associated with the object.

8. The information processing apparatus according to claim 1, wherein the data contains a plurality of pieces of content, and
the parameter amount is a number of pieces of content contained in the data.

9. An information processing apparatus, comprising:
a display control unit that moves a display position of an object in accordance with movement of a contact position when the position in a screen where the object is displayed is contacted and moved; and
a vibration control unit that vibrates the contact position with a vibration amount in accordance with a parameter amount of data associated with the object when the display position of the object moves,
wherein when a display screen is touched by a finger and the display position of the object is moved, the vibration control unit changes the vibration amount in accordance with a number of fingers brought into contact with the display screen.

10. The information processing apparatus according to claim 9, wherein the vibration control unit decreases the vibration amount when the number of fingers increases.

11. A vibration control method in an information processing apparatus, comprising the steps of:
exercising movement control of a display position of an object in accordance with movement of a contact position when the position in a screen when the object is displayed is contacted and moved;
exercising control so that the contact position vibrates with a vibration amount in accordance with a parameter amount of data associated with the object when the movement control of the display position of the object is exercised; and
exercising control so that the contact position vibrates with a vibration amount larger than that during movement of the object for only a predetermined period when the object starts to move.

* * * * *